Sept. 6, 1927.
G. H. HUFFERD
UNIVERSAL COUPLING
Filed March 13, 1926
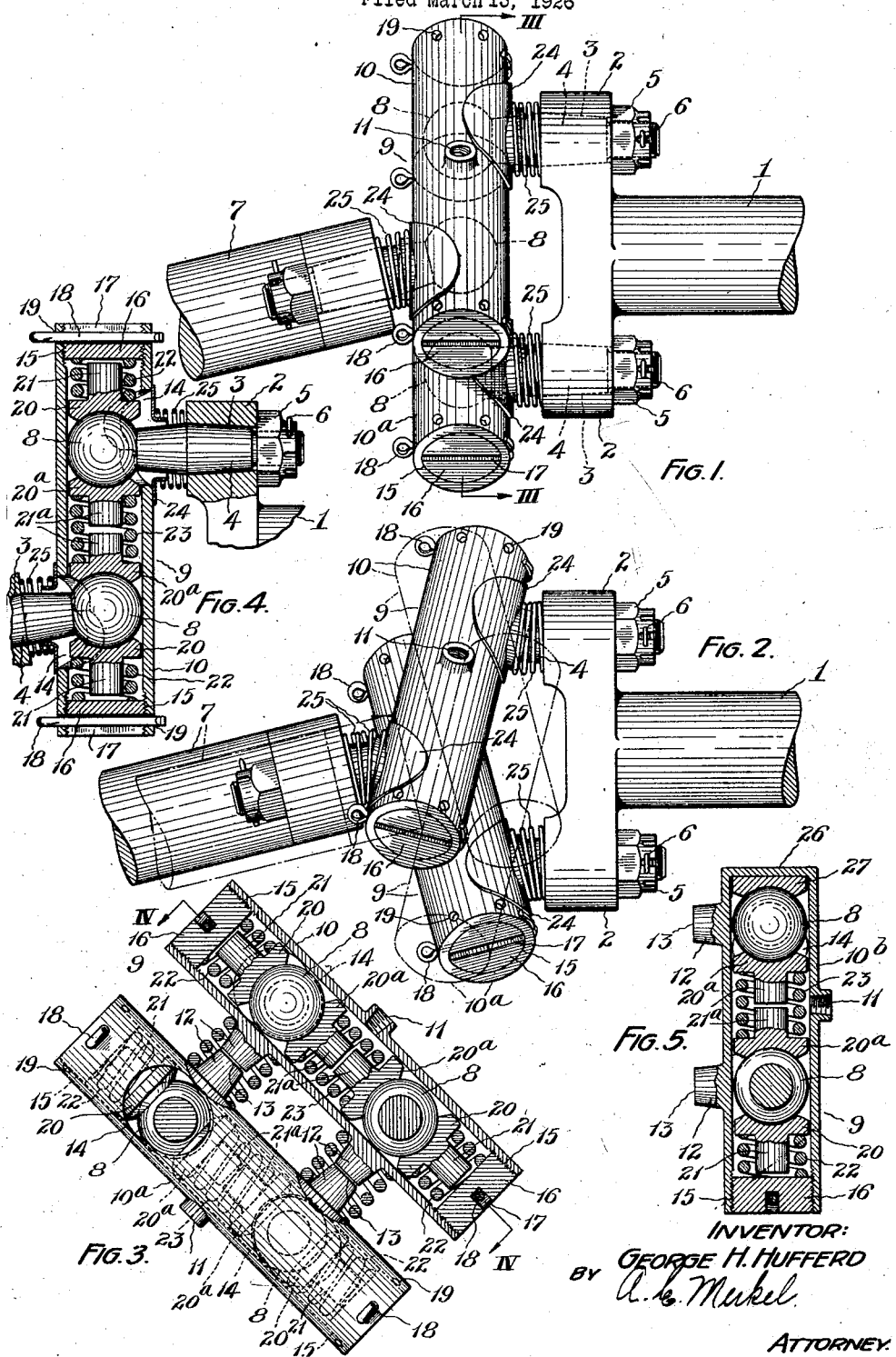
INVENTOR:
GEORGE H. HUFFERD
ATTORNEY.

Patented Sept. 6, 1927.

1,641,385

UNITED STATES PATENT OFFICE.

GEORGE H. HUFFERD, OF DETROIT, MICHIGAN, ASSIGNOR TO THOMPSON PRODUCTS INC., OF CLEVELAND, OHIO, A CORPORATION OF OHIO.

UNIVERSAL COUPLING.

Application filed March 13, 1926. Serial No. 94,537.

The invention relates to universal couplings adapted to connect disalined driving and driven shafts and transmit rotary motion thereof. Such couplings have been embodied in many different forms, many of which are complicated, expensive to manufacture, and lack durability in use.

It is the object of this invention to reduce the cost of such couplings, to take up wear automatically in the joints, and to effect the transmission of power through resilient means.

It is a further object of the invention to dispense with the sliding connection commonly employed where relatively longitudinal motion between the driving and driven shafts is desired.

The invention consists principally in the employment of ball studs, the shanks of which are connected to the driving and driven shafts, with an intermediate member forming a housing for the ball studs, with resilient means so associated with the balls as yieldingly to transmit the driving torque. It also consists in its more specific embodiment, in a provision for permitting relative longitudinal motion between the driving and driven shafts without sliding motion of one part upon the other.

The invention may be embodied in various forms, but for the purpose of explaining the principles involved in the invention I disclose herein three forms, any one of which may be preferred according to the situation in which it is to be employed.

In the annexed drawings:

Figure 1 is a side elevation of the preferred form of coupling made in accordance with this invention;

Fig. 2 is a view similar to Fig. 1 but showing two parts of the coupling in the position which they occupy when the driving and driven shafts have been moved longitudinally away from each other a slight distance;

Fig. 3 is a cross-section on line III—III of Fig. 1 showing the interior construction of the tubular ball joint housing;

Fig. 4 is a longitudinal section through one of the ball joint housings taken in a plane at right angles to the plane of section III—III of Fig. 1, on line IV—IV of Fig. 3.

Fig. 5 is a longitudinal cross-section through a modified form of ball joint housing.

Referring to the drawings in detail in which the same character is used to designate the same part throughout, and first to Figs. 1 to 4, a driving shaft 1 is provided at its end with two radial arms 2 projecting in opposite directions having apertures 3 near the ends, in which are secured the shanks 4 of ball studs of a nature commonly employed in tie rods and drag links, the shanks being held therein by nuts 5 threaded onto the ends thereof and locked in place by lock pins 6. A driven shaft 7 is similarly constructed, and when the two shafts are cooperatively arranged the balls 8 of the ball studs project toward each other for coaction with an intermediate member adapted to transmit the driving torque from the driving to the driven shaft.

The intermediate member, designated generally by 9, in the form shown in Figs. 1 to 4, is composed of two cylindrical ball-joint housings which are identical with each other, but, for convenience of reference, are designated by the different characters 10, $10^a$. Each housing consists of a tube preferably open at both ends, with a lubricating opening 11 through the wall about midway of the ends, and with two lugs 12 projecting outwardly, preferably having flat outer faces 13 for engagement with like lugs of the associated member when the parts are in use. In the wall of the housing, near one end, is an opening 14, and a like opening is formed in the wall on the opposite side near the opposite end of the tube.

At each end the tubes 10, $10^a$ are interiorly threaded, as indicated at 15, to receive an exteriorly threaded retaining plug 16, held in adjusted position by any suitable means; as indicated on the drawings such means consists of a slot or kerf 17 in the outer end of the retaining plug adapted to receive a cotter pin 18 passing through a pair of a series of apertures 19 in the wall of the tube. Between these retaining plugs are the bearings for the ball 8 of the ball studs, consisting of ball seats 20, $20^a$, having spherical curved recesses to form bearings for the balls and reduced extensions 21, $21^a$, to act as stops. Between the ball seats 20 and the inner ends of the retaining plugs and surrounding the stops 21 are strong coil springs 22. Between the two balls 8 in each ball joint housing are two ball seats $20^a$ having their stops $21^a$ extending toward each other, and strong springs 23 surround the stops 21ª and abut the inner surfaces of these ball seats.

The coil springs 22 and 23 press the ball seats firmly into engagement with the balls 8 and the plugs 16 are so adjusted and the dimensions of the stops 21, 21ª are so proportioned, that, when no torque is being transmitted, or there is but a normal load, the stops 21 are separated a slight distance from the retaining plugs 16 and the adjacent stops 21ª are separated a slight distance from each other. From this arrangement it follows that normal driving torque is transmitted through the coil springs 22, 23, but when abnormal resistance in the driven shaft is encountered a stop 21 will be brought into engagement with a retaining plug 16, and the adjacent stops 21ª will engage each other, after which the driving power will be positively transmitted.

In order to keep dust from entering the ball joint a dust cover may be employed, preferably consisting of a plate 24 cylindrically curved to fit the contour of the housing 10 and provided with an opening through which the shank of the ball stud passes and which it snugly engages. The opening in the plate is preferably surrounded by an outwardly extending flange about which is fitted a coil spring 25 engaging the plate and an arm 2 on the driving or driven shaft. A felt or other washer may also be employed if desired.

It will be observed that the construction above described permits the driving and driven shafts to move longitudinally toward or away from each other, as illustrated in Fig. 2, thus dispensing with the sliding connection commonly employed between these parts.

It will be observed, also, that the construction of the ball-joint housings permits the driving power to be applied to either shaft 1 or 7; in other words the power may be reversely applied and the operation will be the same.

In Fig. 5 a modification of the ball-joint housing is shown, in which one end of the tubular member 10ᵇ is permanently closed as indicated at 26, and the adjacent ball seat 27 abuts directly against the closed end without the interposed spring shown in Figs. 1 to 4. The construction is otherwise the same as the form shown in Figs. 1 to 4 and functions in substantially the same way.

It will be apparent from the above description that I have devised a ball stud universal coupling well adapted to accomplish the objects above stated; and while I have disclosed several forms in which my invention may be embodied, it is to be understood that this disclosure is intended merely to clearly exemplify the principles involved. The invention is therefore not confined to the details shown but includes all structures falling within the terms of the appended claims.

What I claim is:

1. In a universal coupling, driving and driven shafts, arms projecting radially in opposite directions from the end of each shaft, the arms of one shaft being at right angles to the arms of the other shaft, ball studs having their shanks rigidly secured in the ends of the arms, an intermediate member consisting of two tubular ball joint housings, ball seats mounted therein serving as bearings for the balls, resilient torque-transmitting means between pairs of balls and rigid, coacting torque-transmitting surfaces on the ball-joint housings, the ball studs of the driving and driven shafts being connected, one to one housing and the other to the other housing alternately.

2. A coupling member comprising a cylindrical ball-joint housing having open ends and longitudinally spaced openings in opposite sides, with two lugs projecting from the outer side at 90 degrees from the openings, ball studs having their balls within the housing with their shanks projecting in opposite directions through said openings, ball seats serving as bearings for the balls, adjustable retaining plugs in the outer ends of the housings, coil springs between the inner adjacent ball seats and similar springs between the outer ball seats and the retaining plugs.

3. In a universal coupling, driving and driven shafts, arms projecting radially in opposite directions from the ends of each shaft, the arms of one shaft being at right angles to the arms of the other shaft, ball studs having their shanks rigidly secured in the ends of the arms, an intermediate member provided with spherically curved bearing surfaces engaging the balls of the ball studs, and resilient means associated with the ball of the ball studs for transmitting the driving torque from the driving shaft to the driven shaft, said intermediate member consisting of two tubular ball joint housings, each engaged by one of the studs carried by the arms of each shaft.

4. In a universal coupling, driving and driven shafts, arms projecting radially in opposite directions from the ends of each shaft, the arms of one shaft being at right angles to the arms of the other shaft, ball studs having their shanks rigidly secured in the ends of the arms, an intermediate member provided with spherically curved bearing surfaces engaging the balls of the ball studs, and resilient means associated with the ball of the ball studs for transmitting the driving torque from the driving shaft to the driven shafts, said intermediate member consisting of two tubular ball joint housings, each provided with rigid surfaces, the surfaces of the one housing co-acting with the surfaces of the other for transmitting the torque.

5. In a universal coupling, driving and driven shafts, arms projecting radially in opposite directions from the end of each shaft, the arms of one shaft being at right angles to the arms of the other shaft, ball studs having their shanks rigidly secured in the ends of the arms, an intermediate member provided with spherically curved bearing surfaces engaging the balls of the ball studs, resilient means associated with the ball studs for transmitting the driving torque from the driving shaft to the driven shaft, said intermediate member consisting of two tubular ball joint housings, each provided with exterior lugs adapted to co-act for the transmission of torque from the one housing to the other, and a coil spring surrounding the two co-acting lugs.

Signed by me this 12th day of February, 1926.

GEORGE H. HUFFERD.